US006397697B1

(12) United States Patent
Ninomiya et al.

(10) Patent No.: US 6,397,697 B1
(45) Date of Patent: Jun. 4, 2002

(54) BALL SCREW

(75) Inventors: Mizuho Ninomiya; Daisuke Maruyama, both of Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/568,048

(22) Filed: May 10, 2000

(30) Foreign Application Priority Data

May 10, 1999 (JP) ............................................ 11-128942

(51) Int. Cl.[7] ................................................ F16H 1/18
(52) U.S. Cl. .................................. 74/424.83; 74/424.86
(58) Field of Search ........................ 74/424.82, 424.83, 74/424.72, 424.86

(56) References Cited

U.S. PATENT DOCUMENTS 3,156,133 A * 11/1964 Anthony ...................... 74/459
3,529,486 A * 9/1970 Galonska et al. ............. 74/459
4,186,621 A * 2/1980 Brusasco ...................... 74/459
6,082,209 A * 7/2000 Yabe et al. ................... 74/459

FOREIGN PATENT DOCUMENTS

JP          10-153245          6/1889

* cited by examiner

*Primary Examiner*—David Fenstermacher
(74) *Attorney, Agent, or Firm*—Sughrue Mion, PLLC

(57) ABSTRACT

In a ball screw according to the present invention, four circulation passages forming a circulation route are respectively arranged in the axial direction of the ball screw. The mounting positions of the second and third circulation passages A2 and A3 are set at positions which are reversed 180 degrees in the circumferential direction thereof with respect to the mounting positions of the first and fourth circulation passages A1 and A4. Accordingly, it is possible to provide a ball screw which can reduce variations in a load distribution along the axial direction of the ball screw caused by moments around a surface perpendicular to the axis of the ball screw that are generated by shifting circumferential-direction phases between circulation passages forming a circulation route from one another.

9 Claims, 13 Drawing Sheets

1/6 ROTATION PHASE

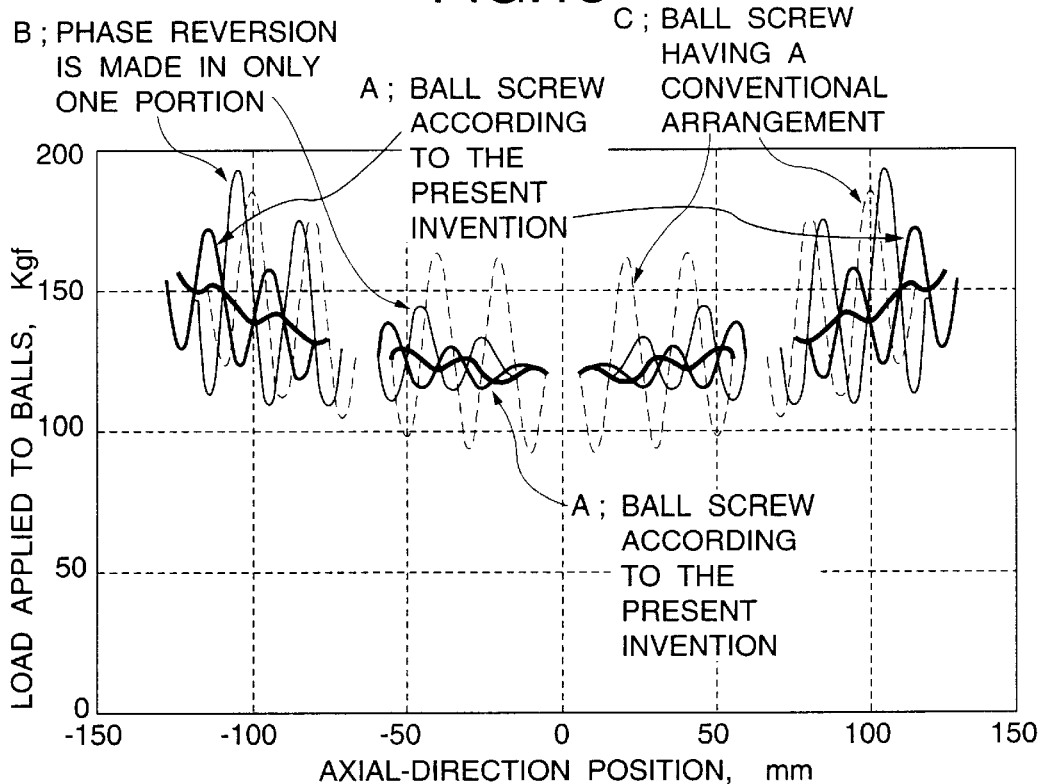
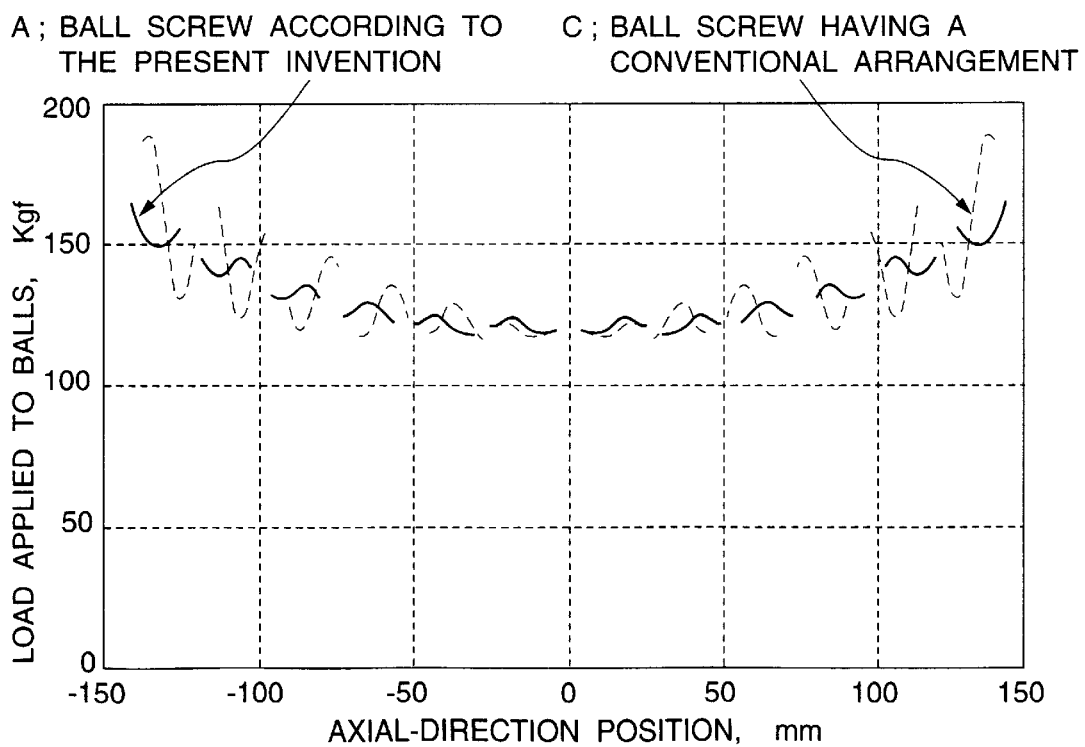

1/6+1/6=1/3 ROTATION PHASE

1/6 ROTATION PHASE

1/6+1/3=1/2 ROTATION PHASE

1/6 ROTATION PHASE

1/6 ROTATION PHASE

BALL SCREW

BACKGROUND OF THE INVENTION

The present invention relates to a ball screw which causes the conversion of rotary motion into linear motion and vice versa and, in particular, to an improvement in a ball screw which is used in a high load applying use.

Conventionally, in a ball screw including a plurality of circulating passages, for example, in a ball screw of a return tube circulation system, in order to reduce the number of steps of working the ball screw, generally, the circulating passages are all arranged in such a manner that the circumferential-direction phases of all circulating passages are identical with each other.

Also, in a ball screw of a circulation frame system, assuming that the number of circulating passages included therein is expressed as n, generally, a plurality of circulating passages are arranged along the axial direction of the ball screw while they are sequentially shifted in phase from each other in the same rotational direction with an equal phase interval equivalent to (1/n) rotation or (2/n) rotation in the circumferential direction.

And, in selecting a ball screw, in order to secure a load capacity corresponding to using conditions such as a load, there are taken various measures: For example, there is selected a ball screw which has a shaft diameter capable of sufficiently withstanding the using conditions, or the number of passages in a ball nut is increased to thereby increase the number of balls, or the lead of the groove of the ball screw is increased to thereby increase the ball diameter.

On the other hand, there is proposed an invention disclosed in Japanese Patent Unexamined Publication No. Hei.10-153245, in which, by equalizing the load distribution of a ball screw, the stress concentration which tends to occur in a ball at a specific position can be relieved, thereby being able to attain the object of providing a ball screw which is compact and has the high load capability without increasing the size of the ball screw.

This conventional invention aims at the following fact. That is, in a ball screw of a return tube circulation system which includes a plurality of circulating passages and also in which the circulating passages are all set identical with each other in the circumferential-direction phases thereof, when an axial-direction load is applied to the ball screw, the arrangement of the effective balls receiving such load is not equalized in the circumferential direction of the circulating passages and the imbalance thereof is relatively large; and, therefore, a high load is applied to part of the balls, that is, to the effective ball portion having a phase in which the number of effective balls is small. According to the cited invention, in a ball screw of a return tube circulation system including three or more circulating passages, the phase of at least one circulating passage is reversed by 180 degrees in the circumferential direction thereof with respect to the remaining circulating passages to thereby equalize variations in the load distribution in the circumferential direction of the circulating passages.

As described above, in the conventional ball screw of a return tube circulation system in which the circumferential-direction phases of all of the circulating passages are arranged identical with each other, in case where an axial-direction load is applied to the ball screw, the arrangement of the effective balls receiving such load is not equalized in the circumferential direction of the circulating passages and also the imbalance thereof is relatively large, so that a high load is applied to the effective ball portion having a phase in which the number of effective balls is small.

On the other hand, as disclosed in the above-mentioned Japanese Patent Unexamined Publication No. Hei.10-153245, in case where the circumferential-direction phase of part of the circulating massages is reversed 180 degrees with respect to the remaining circulating passages, when only the circumferential direction is taken into account, the arrangement of the effective balls receiving the load can be made to approach an equalized state and thus the imbalance hereof becomes small. That is, in this sense, this provides an effective measure to reduce the variations in the load distribution.

However, depending on the manner of arrangement of the circulating passages, the portions respectively having a small number of balls (that is, portions respectively receiving a large load) can be arranged at the mutually opposite positions with respect to the axis of the ball screw; due to such opposite arrangement, there can be generated a moment around a surface perpendicular to the axis of the ball screw; and, such moment around the surface can increase variations in the load distribution along the axial direction of the ball screw. For example, in case where the two mutually adjoining circulating passages share only one portion in which their respective phases are reversed by 180 degrees with respect to each other, with the reversed portion as the boundary, the portions respectively having a small number of balls (that is, portions respectively receiving a large load) are present at the mutually opposite positions with respect to the axis of the ball screw and, due to the presence of a moment around a surface perpendicular to the axis of the ball screw which is generated by such opposite positions, variations in the load distribution along the axial direction of the ball screw are caused to increase.

On the other hand, in the ball screw of a circulation frame system, there are formed three or more circulating passages and, assuming that the number of the circulating passages is expressed as n, the circulating passages are arranged so as to be shifted from one another with an equal phase interval equivalent to (1/n) rotation or (2/n) rotation and return passages are arranged in a spiral manner. That is, since the return passages are arranged symmetrical with respect to the axis of the ball screw when viewed from the axial direction thereof, the ball screw of this system has the advantage of reducing the variations in the load distribution along the circumferential direction of the circulating passages.

However, in the ball screw of this system, because, in the arrangement of the circulating passages along the axial direction of the ball screw, the circulating passages are respectively shifted from one another in the same rotation direction by an equal phase interval in the circumferential direction of the circulating passages, that is, because all of the circulating passages are arranged symmetrical with respect to the axis of the ball screw, there can be generated a moment around a surface perpendicular to the axis of the ball screw, similarly to the previously described ball screw where the two mutually adjoining circulating passages share only one portion in which their respective phases are reversed by 180 degrees with respect to each other. In other words, in the present ball screw, since all of the circulating passages are arranged with an equal phase interval in the circumferential direction of the circulating passages, there is generated a badly-balanced moment around a surface perpendicular to the axis of the ball screw.

SUMMARY OF THE INVENTION

The present invention aims at eliminating the drawbacks found in the conventional ball screws. Accordingly, it is an object of the invention to provide a ball screw which can reduce variations in the load distribution caused by the moment around a surface perpendicular to the axis of the ball screw that is generated by shifting the circumferential-direction phases of circulating passages from one another.

In attaining the above object, according to a first aspect of the invention, there is provided a ball screw comprising: a screw shaft including a ball screw groove on the outer surface thereof; at least one ball nut including on the inner surface thereof a ball screw groove opposed to the ball screw groove of the screw shaft; a spiral-shaped passage formed by the ball screw groove of the ball nut and the ball screw groove of the screw shaft; a large number of balls capable of circulating through the spiral-shaped passage; and, a return passage formed on the ball nut for allowing the large number of balls to circulate through the spiral-shaped passage, wherein three or more circulation passages each comprising the spiral-shaped passage and return passage are arranged along the axial direction of the ball screw, wherein, in the circumferential-direction phases of the three or more circulation passages, there are formed at least two portions in which the phases of two mutually adjoining circulation passages are reversed 180 degrees with respect to each other.

According to the first aspect of the invention, by reversing part of the circulation passages 180 degrees with respect to the remaining circulation passages, variations in the load distribution in the circumferential direction of the circulation passages can be improved; and, by setting two portions in which the phases of two mutually adjoining circulation passages are reversed 180 degrees with respect to each other, variations in the load distribution in the axial direction of the ball screw caused by moments around a surface perpendicular to the axis of the ball screw that are generated by shifting the circumferential-direction phases of the circulation passages from each other can be improved.

Now, description will be given below of the reason why the balance of the load distribution can by improved by setting two portions in which the phases of two mutually adjoining circulation passages are reversed 180 degrees with respect to each other.

In the case of a ball screw including only one portion in which the phases of the mutually adjoining circulation passages are reversed 180 with respect to each other, a portion in which the number of balls existing along the circumferential direction of the circulation passages is small (that is, a portion receiving a large load) exists at a position diagonal to the axis of the ball screw, which provides a moment around a surface perpendicular to the axis of the ball screw. The number of moments generated around the surface corresponds to the number of times of 180-degree reversions of the phases between the circulation passages. However, in the case of the mutually adjoining moments, since the directions of the above-mentioned diagonal angles are opposite, the moments provide mutually opposite moments and thus they can cancel or weaken each other. In this manner, by providing two or more phase reversion portions, the balance between the above moments caused by setting the circumferential-direction phase difference between the mutually adjoining circulation passages can be improved, which can reduce the variations in the axial-direction load distribution caused by such moments.

In this case, preferably, in order that the mutually canceling moments can paired with each other, the mutually opposite-direction moments may be generated so as to be equal in number, and the number of portions in which the 180 deg. reversion is made may be set in an even number (especially, two).

Next, according to the second aspect of the invention, there is provided a ball screw comprising: a screw shaft including a ball screw groove on the outer surface thereof; at least one ball nut including on the inner surface thereof a ball screw groove opposed to the ball screw groove of the screw shaft; a spiral-shaped passage formed by the ball screw groove of the ball nut and the ball screw groove of the screw shaft; a large number of balls capable of circulating through the spiral-shaped passage; and, a return passage formed on the ball nut for allowing the large number of balls to circulate through the spiral-shaped passage, wherein three or more circulation passages each comprising the spiral-shaped passage and return passage are arranged along the axial direction of the ball screw, and a phase difference is set between part or all of mutually adjoining circulation passages in the circumferential direction thereof, wherein the three or more circulation passages are arranged so as to have an almost surface symmetry with respect to a surface passing through the axial-direction center of the whole of the three or more circulation passages or passing through the neighboring portion of such axial-direction center and being perpendicular to the axis of the ball screw.

By the way, in order to control the variations in the circumferential-direction load distribution, preferably, the above-mentioned circumferential-direction phase difference may be set for 180 degrees or may be set for an equal phase interval such as (m/the number of circulation passages, where m=integral number) so that the positions of the return passages of all of the circulation passages have a point symmetry with respect to the axis of the ball screw when viewed from the axial direction of the ball screw.

According to the second aspect of the invention, since a circumferential-direction phase difference is set between part or all of the circulation passages, even when there exist moments around a surface perpendicular to the axis of the ball screw, the above phase differences are set so as to have a surface symmetry with the axial-direction center of the whole of the circulation passages as the boundary thereof, two moments opposite in direction and equal in intensity are present while they are paired with each other. As a result of this, the paired moments cancel each other so that the moments around a surface perpendicular to the axis of the ball screw generated due to the arrangement of the three or more circulation passages are allowed to balance well, thereby being able to reduce the variations in the axial-direction load distribution caused by the moments.

For example, in case where the second aspect of the invention is applied to a ball screw in which a phase difference of 180 degree is set in part of the mutually adjoining circulation passages, there exist an even number of 180-deg. phase reversion portions and they are arranged symmetrical with respect to the axial-direction center of the whole of the three or more circulation passages.

Next, according to the third aspect of the invention, there is provided a ball screw comprising: a screw shaft including a ball screw groove on the outer surface thereof; at least one ball nut including on the inner surface thereof a ball screw groove opposed to the ball screw groove of the screw shaft; a spiral-shaped passage formed by the ball screw groove of the ball nut and the ball screw groove of the screw shaft; a large number of balls capable of circulating through the spiral-shaped passage; and, a return passage formed on the ball nut for allowing the large number of balls to circulate through the spiral-shaped passage, wherein three or more circulation passages each comprising the spiral-shaped passage and return passage are arranged along the axial direction of the ball screw, and a phase difference is set between part or all of mutually adjoining circulation passages in the circumferential direction thereof, wherein, in at least one portion between the mutually adjoining circulation passages, the circumferential-direction phase interval thereof is offset from the equal phase interval.

According to the third aspect of the invention, as in a ball screw of a circulation frame system, in a ball screw in which, assuming that a circulation route comprises three or more circulation passages and the number of circulation passages is expressed as n, the circulation passages are arranged at a phase difference of an equal phase interval such as (1/n) rotation or (2/n) rotation to thereby control variations in the circumferential-direction load distribution, by changing the phase interval of at least one portion thereof (that is, by offsetting the phase interval from the equal phase interval), the balance between the moments around a surface perpendicular to the axis of the ball screw is improved to thereby be able to reduce the variations in the axial-direction load distribution caused by the present moments.

To determine the above offsetting quantity, an analysis for improving the direction balance of the moments may be made and the offsetting quantity may be determined in accordance with the results of the analysis.

By the way, even in case where the phase interval of part of the circulation passages is changed, preferably, the phases of the remaining circulation passages may be set in such a manner that the return passages of all of the circulation passages are arranged so as to have a point symmetry with respect to the axis of the ball screw when viewed from the axial direction of the ball axis.

BRIEF DESCRIPTION OF THE DRAWINGS

FIG. 13 is a graphical representation of the analysis results of the second embodiment of the invention;

FIG. 14 is a graphical representation of the analysis results of a third embodiment of the invention;

DETAILED DESCRIPTION OF THE PREFERRED EMBODIMENTS

Next, description will be given below of a ball screw according to a first mode for carrying out the invention with reference to the accompanying drawings. By the way, in this specification, description will be given of a ball screw of a return tube circulating system as a typical example thereof. However, the invention is not limited to this but it can also be applied to ball screws of other circulating systems such as a frame circulating system and a guide plate circulating system.

Figure 1:
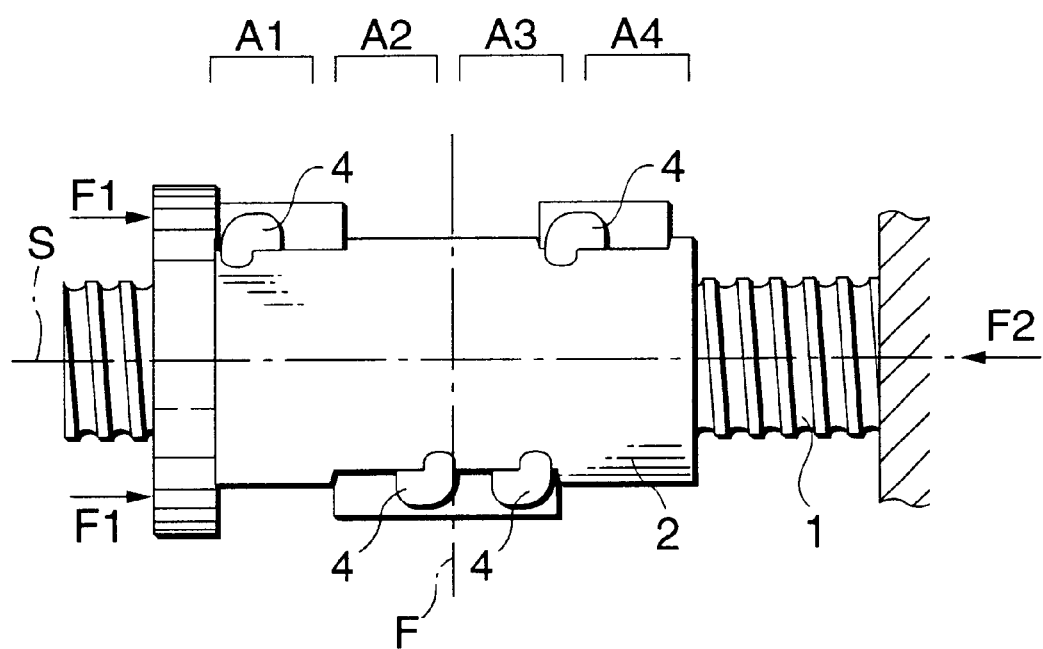
FIG. 1 is a schematic view of a ball screw according to a first mode for carrying out the invention.

In a ball screw according to the present mode for carrying out the invention, as shown in FIG. 1, a ball nut 2 is threadedly engaged with the outer periphery of a screw shaft 1 through a plurality of balls, while one of the screw shaft 1 and ball nut 2 is rotated with respect to the other to thereby allow the ball nut 2 to execute a relative linear motion with respect to the screw shaft 1.

Figure 2:
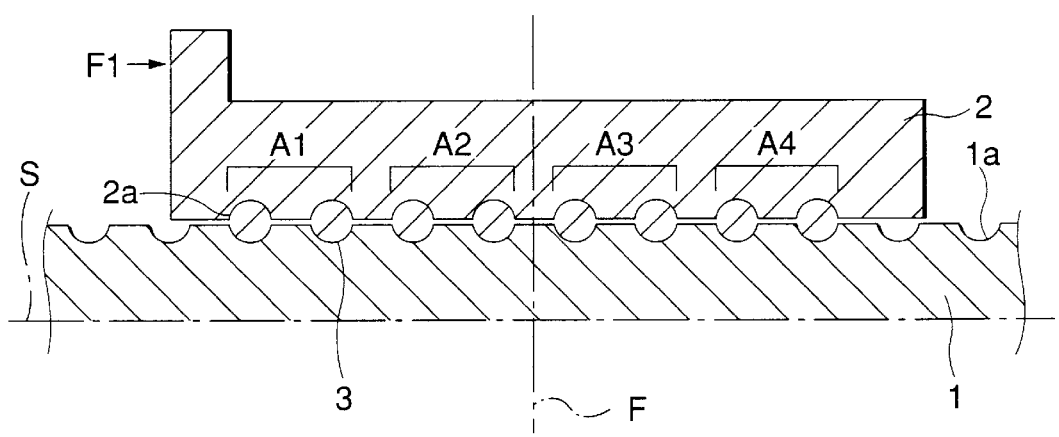
FIG. 2 is a schematic structure view of a ball screw according to the first mode for carrying out the invention.

That is, as shown in FIG. 2 which is a schematic structure view of the ball screw, on the outer peripheral surface of the screw shaft 1, there is formed a female-screw-shaped ball screw groove 1a and, on the inner peripheral surface of the ball nut 2 as well, at a position which is opposed in the diameter direction to the ball screw groove 1a of the screw shaft 1, there is formed a female-screw-shaped ball screw groove 2a. Into a spiral-shaped passage which is formed by the two ball screw grooves 1a and 2a, there are inserted a plurality of balls 3 (in FIG. 2, they are respectively shown by an oblique line) ; and, the balls 3 are allowed to roll along the two ball screw grooves 1a and 2a and are returned through a return passage composed of a circulation tube 4, whereby the balls 3 are allowed to circulate the circulation passage.

In the present embodiment, the ball screw 4 is a ball screw in which there are arranged four circulation passages in the axial direction of the ball screw. That is, the ball screw groove 2a of the ball nut 2, as shown in FIG. 2, is divided into four blocks along the axial direction of the ball screw and the two end portions of each of the four blocks of the ball screw groove 2a are connected together by the circulation tube 4, thereby forming a circulation route which is composed of the four circulation passages.

By the way, for convenience of explanation, the above four circulation passages of the circulation route are respectively referred herein to as a first circulation passage A1, a second circulation passage A2, a third circulation passage A3 and a fourth circulation passage A4 in the order starting from the left to the right in FIGS. 1 and 2.

In the present embodiment, the mounting positions of the circulation tubes 4 of the second and third circulation passages A2 and A3, as shown in FIG. 1, are respectively set at positions which are reversed 180° in the circumferential direction of the ball nut with respect to the mounting positions of the circulation tubes 4 of the first and fourth circulation passages A1 and A4.

Thanks to this arrangement, the phases of the first and second circulation passages A1 and A2 which are mutually adjoining circulation passages are reversed 180° with respect to each other in the circumferential direction of the ball nut, and the phases of the third and fourth circulation passages A3 and A4 are reversed 180° with respect to each other in the circumferential direction of the ball nut, thereby being able to obtain two portions in which the phases of the mutually adjoining circulation passages are reversed 180° with respect to each other in the circumferential direction of the ball nut.

Further, since the second and third circulation passages A2 and A3 are set in phase with each other, the four circulation passages A1–A4 can be arranged so as to have a surface symmetry with respect to a surface F which passes through the axial-direction center of the whole of the four circulation massages (that is, between the second and third circulation passages) and is perpendicular to the axis S of the ball screw.

Next, description will be given below of the operation and effects of the ball screw having the above structure.

Since the mounting positions of the circulation tubes 4 of the second and third circulation passages A2 and A3 are respectively reversed 180° in the circumferential direction of the ball nut with respect to the mounting positions of the circulation tubes 4 of the first and fourth circulation passages A1 and A4, there is eliminated a possibility that the portions of the first and fourth circulation passages A1 and A4 that have a small number of effective balls can be superimposed on the portions of the second and third circulation passages A2 and A3 that have a small number of effective balls in the circumferential direction of the ball nut. That is, the no-load portions (portions where the balls 3 do not exist) in the circumferential direction of the ball nut are dispersed to thereby be able to control variations in the distribution of loads applied to the respective effective balls 3 in the circumferential direction of the ball nut.

Figure 3:
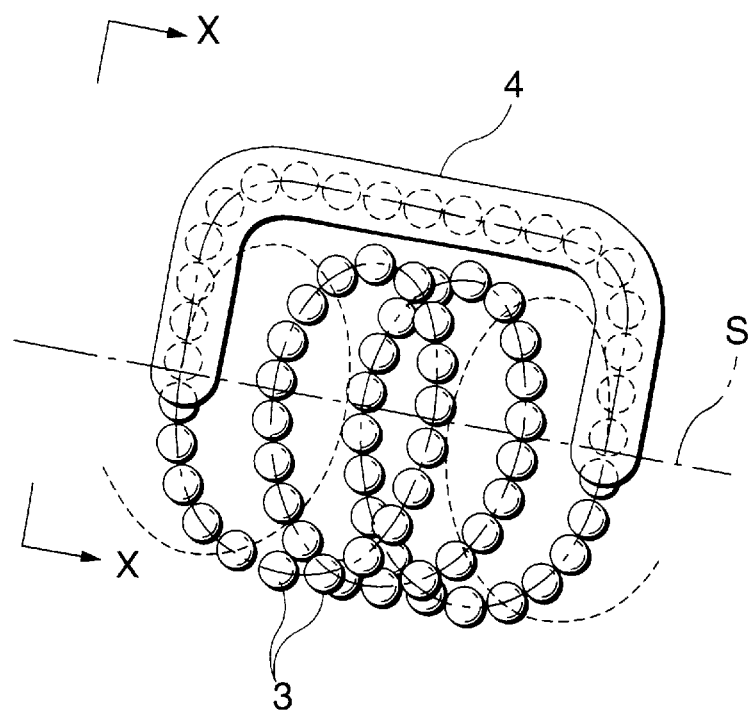
FIG. 3 is a schematic view of circulation of balls in one of passages forming a circulation passage of the above ball screw.
Figure 4:
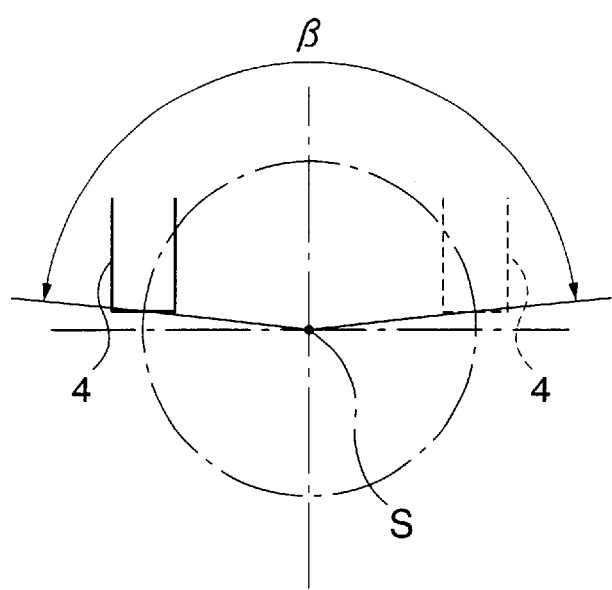
FIG. 4 is a view taken along the arrow line X—X shown in FIG. 3, showing a portion of the passage in which the number of balls is small when viewed from the axial direction of the ball screw.

Here, the balls 3 in the respective circulation passages are sequentially scooped up from the two ball screw grooves 1a and 2a into the circulation tubes 4 and are allowed to circulate through the circulation tubes 4 and, therefore, on the track of the screw shaft 1 that is opposed to the ball nut 2, there exist portions in which the balls 3 are not present. These provide variations in the load distribution in the circumferential direction of the ball nut or the ball screw, with the result that high loads are applied to part of the effective balls 3. That is, while the circulation of the balls 3 in the respective circulation passages within the ball nut 2 can be shown as in FIG. 3, as the balls 3 are scooped up from the ball groove 2a into the circulation tube 4, when viewed from the axial direction of the ball nut 2, as shown in FIG. 4, the number of balls in the range of the β angle in the circumferential direction of the ball nut 2 becomes relatively small, so that the loads applied to the balls 3 in the range of the β angle are caused to become relatively large. Since the portions in which the number of balls becomes relatively small in the above-mentioned circumferential direction can be regulated by the mounting positions of the circulation tubes 4, by reversing the circumferential-direction phases of the second and third circulation passages A2 and A3 respectively by 180 degrees with respect to the first and fourth circulation passages A1 and A4 as described previously, the variations in the load distribution in the circumferential direction can be reduced. Especially, in the present embodiment, because the first and fourth circulation passages are set in phase with each other as well as the second and third circulation passages are set in phase with each other, the variations in the load distribution in the circumferential direction can be reduced more effectively.

By the way, since the above-mentioned β angle corresponding to the portion in which the number of balls becomes relatively small in the respective circulation passages is smaller than 180 degrees, in the circulation passages A1, A4 and A2, A3 whose phases are reversed by 180 degrees with respect to one other, there is no possibility that the portions respectively having a small number of balls can be superimposed on each other when viewed from the axial direction of the ball screw.

Also, in case where the circumferential-direction phases of the first and second circulation passages A1 and A2 are reversed by 180 degrees with respect to each other, the mounting positions of their respective circulation tubes 4 are disposed mutually diagonal with respect to the axis S of the ball screw, which causes a moment around a surface perpendicular to the axis S. Similarly, in case where the circumferential-direction phases of the third and fourth circulation passages A3 and A4 are reversed by 180 degrees with respect to each other, the mounting positions of their respective circulation tubes 4 are disposed mutually diagonal with respect to the axis S of the ball screw, which causes a moment around a surface perpendicular to the axis S. However, since the directions of the above-mentioned diagonal arrangements are opposite to each other, the directions of the above two moments are opposite to each other and are equal in intensity to each other, so that the two moments cancel each other to thereby reduce the variations in the axial-direction load distribution caused by the two moments.

Especially, in the present embodiment, since the four circulation passages are arranged so as to have a surface symmetry with respect to the surface F which passes through the axial-direction center of the whole of the four circulation passages and is perpendicular to the axis S of the ball screw, with the axial-direction center of the four circulation passages as the boundary, the load distributions in the circulation passages are allowed to balance on the axial-direction two sides of the circulation passages most effectively, thereby being able to reduce most effectively the variations in the axial-direction load distribution caused by the two moments.

As described above, in the ball screw according to the present embodiment, not only the variations in the circumferential-direction load distribution can be reduced effectively out also the variations in the load distribution caused by the moments around the surface perpendicular to the axis S of the ball screw can be reduced effectively.

In other words, by the simple means of shifting the circumferential-direction phases of the respective circulation passages of the circulation route from each other, the load distribution between the plurality of balls 3 respectively rolling between the screw shaft 1 and ball nut 2 can be uniformed, which can relieve the concentration of the loads onto part of the balls 3. As a result of this, the load capacity of the ball screw can be increased over the conventional ball screw without increasing the diameter of the screw shaft of the ball screw. For this reason, according to the present embodiment, especially, there can be provided a ball screw which can be optimally applied as a high load capacity ball screw for use in an electric injection molding machine.

This means that the load capacity of the ball screw can be increased without increasing the size of the ball screw, or, the size of a ball screw capable of obtaining an equivalent load capacity can be reduced, the range of application of a ball screw to the high load use can be widened.

Here, in the above embodiment, description has been given of the case in which the circulation route is composed of four circulation passages. However, this is not limitative but, for example, the circulation route may be composed of three circulation passages or may comprise five or more circulation passages. But, as shown in another embodiment which will be discussed later, since the effects of the invention are larger in the circulation route comprising four circulation passages than in the circulation passage route comprising three circulation passages, the first and second aspects of the invention may be preferably applied to a ball screw in which a circulation route comprises four or more circulation passages.

Also, in the present embodiment, the arrangement of all of the circulation passages is regulated in such a manner that the circulation passages have a surface symmetry in the axial-direction central portion thereof. However, instead of the arrangement having a surface symmetry in the central portion thereof, for example, the phases of the mutually adjoining circulation passages may all be reversed by 180 degrees to thereby provide four 180 deg. reversed portions.

Further, according to the present embodiment, since the circumferential-direction phase difference between the mutually adjoining circulation passages is set for 180 degrees, in case where the circulation passages are set so as to have a surface symmetry with respect to the surface F which passes through the axial-direction center of the whole of the four circulation passages and is perpendicular to the axis S of the ball screw, there can be automatically set two or more portions in which the phases of the mutually adjoining circulation passages are reversed 180 degrees with respect to each other.

However, even in other cases where the circumferential-direction phase difference between the mutually adjoining circulation passages is set different from 180 degrees, the effect of the second aspect of the invention can also be obtained: that is, all of the circulation passages are arranged so as to have a surface symmetry with respect to the surface F which passes through the axial-direction center of the whole of the four circulation passages and is perpendicular to the axis S of the ball screw, thereby being able to reduce the variations in the axial-direction load distribution caused by the moments generated around a surface perpendicular to the axis S.

For example, in a conventional ball screw in which a circulation route comprises twelve circulation passages and mutually adjoining passages in the same rotation direction are arranged with a circumferential-direction phase difference consisting of an equal phase interval of ⅙ rotation (60 degrees) and the return passages of the circulation passages are each formed in a spiral manner; that is, in the ball screw in which the circulation passages are arranged so as to have a point symmetry with respect to the axial-direction center point of the circulation passages, by arranging the circulation passages in such a manner that they have a surface symmetry with respect to a surface which passes through the axial-direction center of the whole of the twelve circulation passages and is perpendicular to the axis S of the ball screw, there are generated moments around a surface perpendicular to the axis S in such a manner that the moments are symmetrical with respect to the surface which passes through the axial-direction center of the whole of the twelve passages and is perpendicular to the axis S, thereby being able to reduce the variations in the axial-direction load distribution caused by the thus generated around-surface moments.

Next, description will be given below of a second mode for carrying out the invention with reference to the accompanying drawings. By the way, in the mode, the same parts as those employed in the above-mentioned first mode are given the same designations and thus the description thereof is emitted here.

Also, in the present mode, description will be given of a ball screw of a frame circulating system as an example. However, the present mode is not limited to this but, for example, it can also be applied to ball screws of other circulating systems such as a ball screw of a return tube circulating system and a ball screw of a guide plate circulating system.

Figure 5:
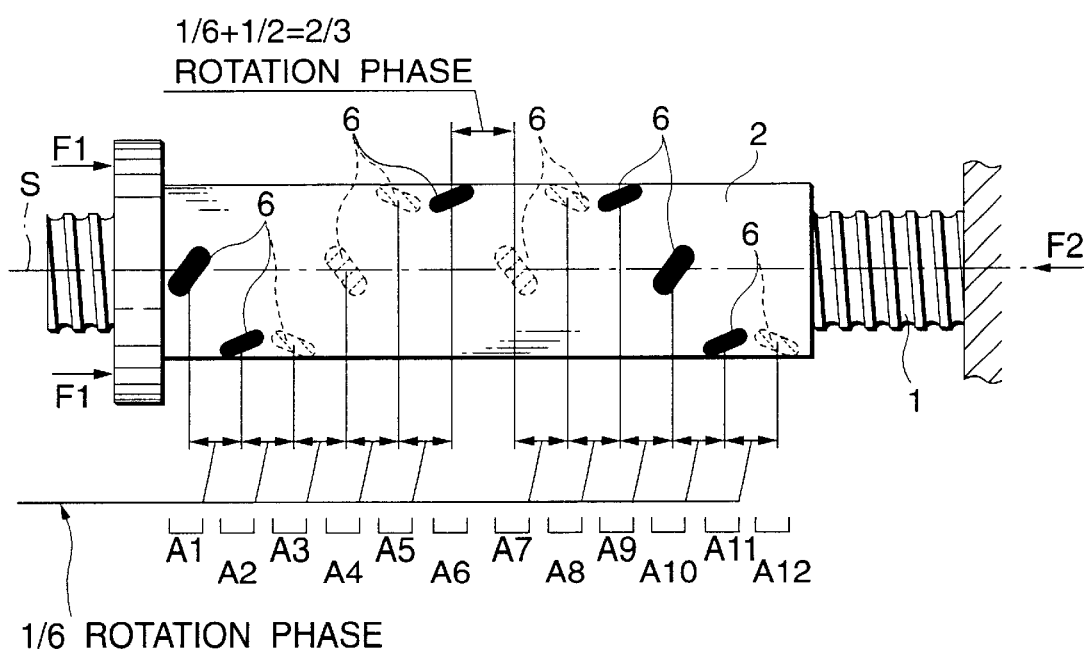
FIG. 5 is a schematic view of a ball screw according to a second mode for carrying out the invention.

In the ball screw according to the present mode, as shown in FIG. 5, the ball nut 2 is threadedly engaged with the outer periphery of the screw shaft 1 through a plurality of balls and one of the screw shaft 1 and ball nut 2 is rotated with respect to the other to thereby carry out a relative linear motion with respect to the other.

Figure 6:
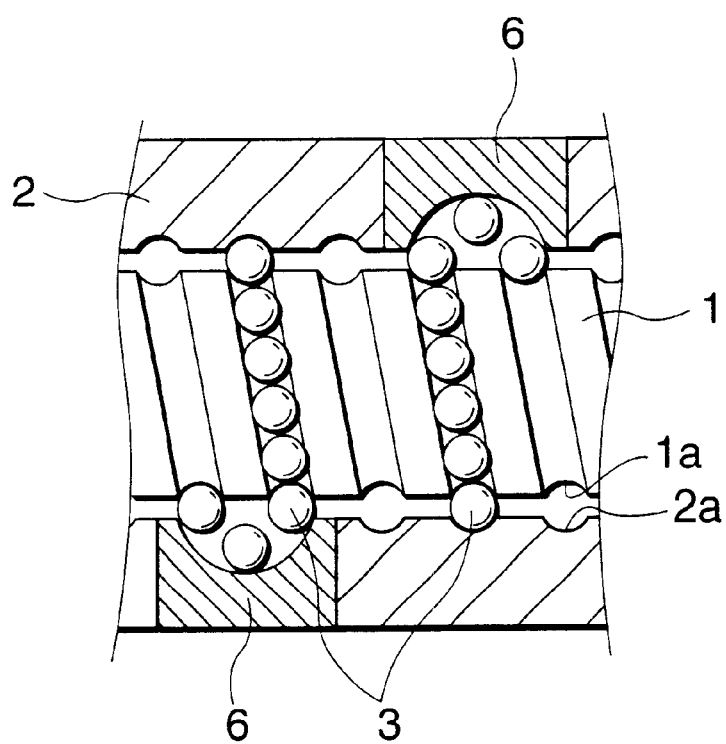
FIG. 6 is a schematic structure view of a ball screw according to the second mode for carrying out the invention.

That is, as shown in FIG. 6 which is a schematic structure view of the ball screw according to the second mode, on the outer peripheral surface of the screw shaft 1, there is formed a female-screw-shaped ball screw groove 1a and, on the inner peripheral surface of the ball nut 2 as well, at a position which is opposed in the diameter direction of the ball nut 2 to the ball screw groove 1a of the screw shaft 1, there is formed a female-screw-shaped ball screw groove 2a. Into a spiral-shaped passage which is formed by the two ball screw grooves 1a and 2a, Where are inserted a plurality of balls 3; and, the balls 3 are allowed to roll along the two ball screw grooves 1a and 2a and are returned through a return passage comprising a frame 6, whereby the balls 3 are allowed to achieve a circulatory motion. The frame 6 is a member which is embedded in the ball nut 2 and moves beyond the outer periphery of the screw shaft 1 every lead to thereby return the ball 3.

In the present mode, as shown in FIG. 5, a circulation route comprises twelve circulation passages; and, the mounting positions of the frames 6 of the mutually adjoining circulation passages in the same rotation direction are arranged in such a manner that they are sequentially shifted in the circumferential direction from each other with a phase difference consisting of an equal phase interval of ⅙ rotation (60 degrees), so that the positions of the frames 6 are set in a spiral manner. In FIG. 5, the frames 6, which can be seen on the front surface of the ball nut 2, are shown in black.

However, in the ball screw according to the present mode, assuming that the circulation passages are respectively referred to as a first circulation passage A1, a second circulation passage A2, - - - , and a twelfth circulation passage A12 in the order starting from the left in FIG. 5, the phase difference between the mounting position of the frame 6 of the sixth circulation passage A6 and the mounting position of the frame 6 of the seventh circulation passage A7 is increased by ½ rotation (180 degrees) from the equal phase interval to thereby provide a phase difference of ⅔ rotation (240 degrees); that is, the present phase difference is set four times the above-mentioned equal phase interval.

Figure 7:
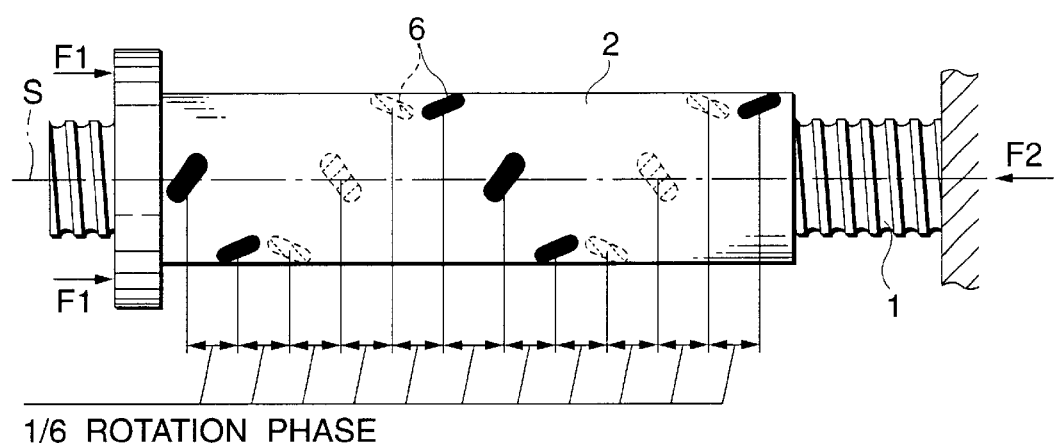
FIG. 7 is a schematic structure view of a conventional ball screw.

By the way, for reference, in FIG. 7, there is shown a ball screw in which the circulation passages of a circulation route thereof are arranged according to the conventional specifications.

Next, description will be given below of the operation and effects of the ball screw having the above structure according to the second mode for carrying the invention.

In the ball screw according to the second mode, although the phase difference between the sixth and seventh circulation passages 6A and 7A is set different from those between the remaining circulation passages, since the positions of the frames 6 of all of the circulation passages are arranged symmetric with respect to the axis S of the ball screw when they are viewed from the axial direction of the ball screw, the load distribution in the circumferential direction of the circulation passages can be kept well-balanced in spite of such different setting of the phase difference between the sixth and seventh circulation passages 6A and 7A.

Also, since the phase difference between the sixth and seventh circulation passages 6A and 7A is increased by ½ rotation (180 degrees) over the phase differences between the other remaining circulation passages, a moment around a surface perpendicular to the axis S of the ball screw caused by a group of first to sixth circulation passages and a moment around a surface perpendicular to the axis S of the ball screw caused by a group of seventh to twelfth circulation passages are reversed 180 degrees with respect to each other with the axial-direction center of the whole circulation route as the boundary, so that these two moments cancel each other to thereby be able to reduce the variations in the axial-direction load distribution caused by these two moments.

Especially, in the present mode, since the two moments respectively caused by the two circulation passage groups with the axial-direction center of the whole circulation route as the boundary are equal in the intensity and opposite in the direction, the variations in the axial-direction load distribution caused by these two moments can be reduced more effectively.

As described above, in the ball screw according to the present mode, not only the variations in the circumferential-direction load distribution can be reduced effectively but also the variations in the load distribution caused by the moments around the surface perpendicular to the axis S of the ball screw can be reduced effectively.

That is, by the simple means of shifting the circumferential-direction phases of the respective circulation passages of the circulation route from each other, the load distribution between the plurality of balls 3 respectively rolling between the screw shaft 1 and ball rut 2 can be uniformed, which can relieve the concentration of the loads onto part of the balls 3. As a result of this, the load capacity of the ball screw can be increased over the conventional ball screw without increasing the diameter of the screw shaft of the ball screw.

This means that the load capacity of the ball screw can be increased without increasing the size of the ball screw, or the size of a ball screw capable of obtaining an equivalent load capacity can be reduced, thereby being able to widen the range of application of the ball screw to the high load use.

Here, in the above mode, description has been given of the case in which the circulation route comprises twelve circulation passages. However, this is not limitative but, for example, the circulation route may be composed of three to eleven circulation passages or may be composed of thirteen or more circulation passages.

Also, in the present mode, the phase difference between a couple of circulation passages situated at the axial-direction center portion of the whole circulating route is set different from those between the other remaining circulation passages. However, this is not limitative but a phase difference between a couple of circulation passages situated at other portion than the above center portion may also be set different from those between the other remaining circulation passages. Also, the number of portions where a phase difference between a couple of circulation passages is set different from those between the remaining circulation passages is not limited to one, but the number of such phase-difference portions may also be two or more.

However, in order that the two moments to be respectively generated on the both sides of the axial direction of the screw ball with the axial-direction center of the whole circulation route as the boundary can be well-balanced, preferably, the phases of a couple of circulation passages, which are arranged at positions symmetric in the axial direction of the screw ball with respect to the axial-direction center of the whole circulation route, may be respectively offset by the same amount to thereby have a different phase difference from those between the remaining passages. From this point of view, as in the above-mentioned mode, to shift or offset the phase difference between a couple of circulation passages situated in the axial-direction center portion of the whole circulation route from the other phase differences is advantageous in that the number of portions to be offset is only one, a structure necessary for such offsetting is simple, and variations in the load distribution can be reduced effectively.

Also, although the quantity of offsetting is not limited to ½ rotation (180 degrees), in the above mode, in the case of the offsetting quantity of ½ rotation (180 degrees), the variations in the load distribution caused by the moments around the surface perpendicular to the axis S of the ball screw can be reduced most effectively.

In short, in case where the number of portions where a phase differenc e between a couple of circulation passages is set different from those between the remaining circulation passages is one, the offsetting quantity may be set in such a manner that two moments respectively caused around a surface perpendicular to the axis S of the ball screw by two circulation passage groups respectively located on the two sides of the axial-direction center of the whole circulation route with the phase difference offset portion as the boundary can cancel each other.

By the way, as a measure to improve the load capacity of the ball screw, there is a method of increasing the number of effective balls 3, which receive the load, correspondingly to an increase in the number of circulation passages; but, in this method, the increased number of effective balls increases the length of the ball screw, which makes it difficult to machine the inner surface of the ball screw. Accordingly, instead of this method, here is also used another method in which a plurality of ball nuts 2 are combined together to thereby improve the load capacity of the ball screw as a whole.

The present invention can apply similarly to such ball screw using a plurality of ball nuts 2 in a combined manner. In this case, the arrangement of the circulation passages of the ball screw, as the whole structure thereof including the plurality of combined ball nuts 2, may be made in accordance with the spirit and scope of the present invention.

Figure 8:
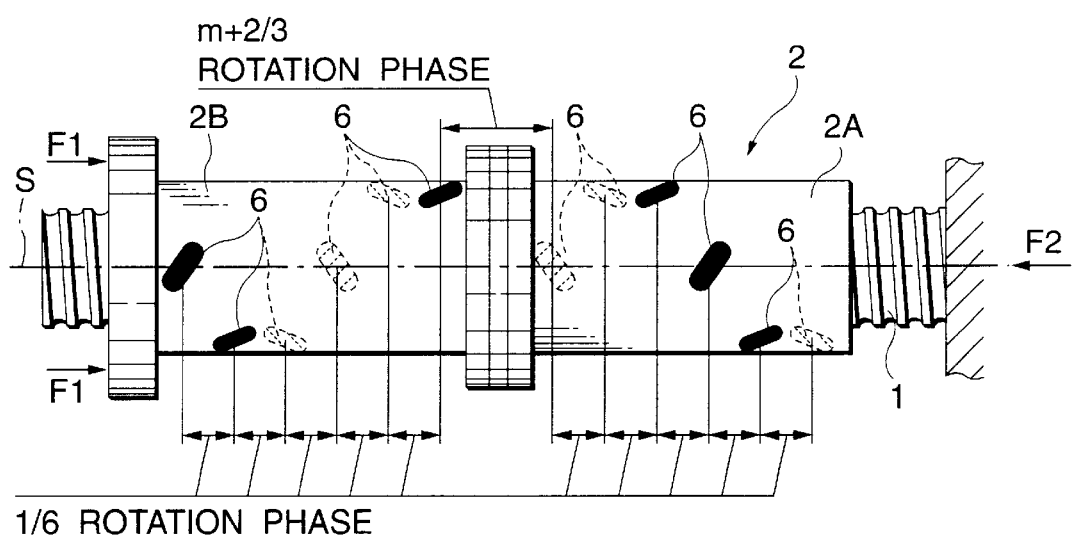
FIG. 8 is another schematic view of the ball screw according to the second mode for carrying out the invention.

For example, in,the ball screw, which has been described above in the above-mentioned second mode for carrying out the invention, a circulation route is composed of twelve circulation passages respectively formed in a single ball nut 2. However, as shown in FIG. 8, the present invention can also be applied to a ball screw in which, in each of two ball nuts 2A and 2B combined together in series, a circulation route is composed of six circulation passages. In this case, each of the two ball nuts 2A and 2B has a circulation route composed of six circulation passages and these circulation passages are all disposed in such a manner that every couple of mutually adjoining circulation passages have a phase difference which consists of an equal phase interval of ⅙ rotation. In this respect, this ball screw is similar to the above-mentioned conventional ball screw; but, the present invention is applied to the manner of combination of the two ball nuts 2. That is, in case where the two ball nuts 2 are combined together in such a manner that the phase interval between the sixth and seventh circulation passages of all passages, which are allowed to adjoin each other as a result of the combination of the two ball nuts 2, provides (m+⅔) rotation (m is an integral number) there can be obtained an effect almost equivalent to the ball screw according to the above-mentioned second mode for carrying the invention.

Also, the present invention relates to the arrangement of the circulation passages of a ball screw, that is, the expressions such as the return tube circulating system and circulation frame system are simply used for convenience of explanation. Therefore, the range of application of the invention is not limited by the kinds of circulating systems.

EMBODIMENTS

First Embodiment

Figure 9A:
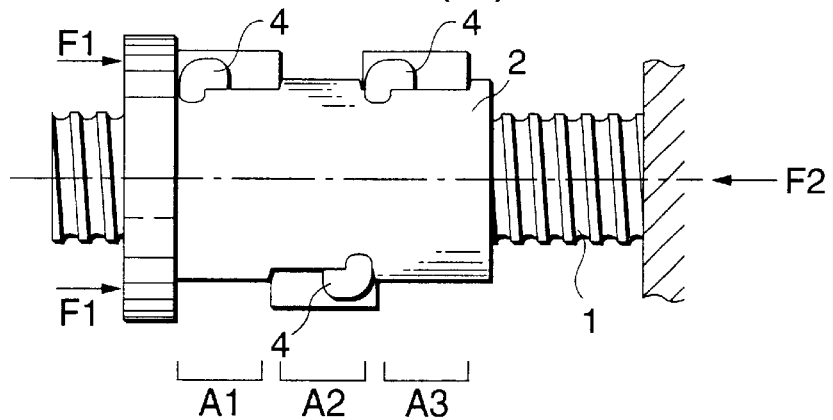
FIG. 9(A) is a schematic view of a ball screw according to the invention, and FIGS. 9(B) and (C) are respectively are schematic views of ball screws for comparison with the ball screw according to the invention.
Figure 9B:
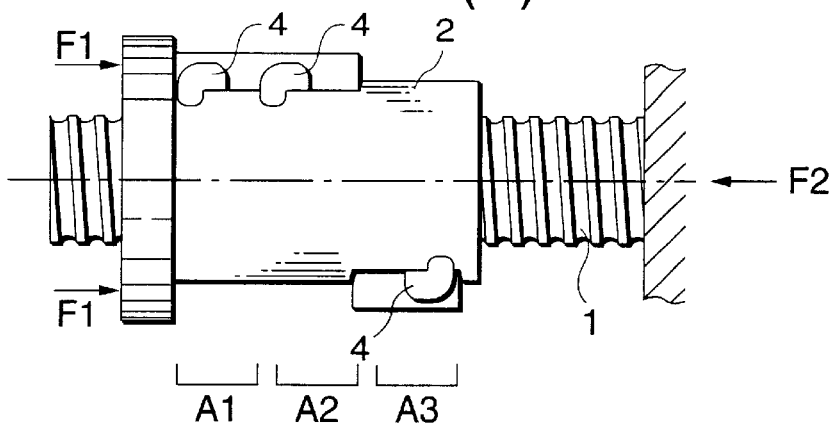
FIG. 9 is an explanatory view of a ball screw according to a first embodiment according to the invention; and, in particular.
Figure 9C:
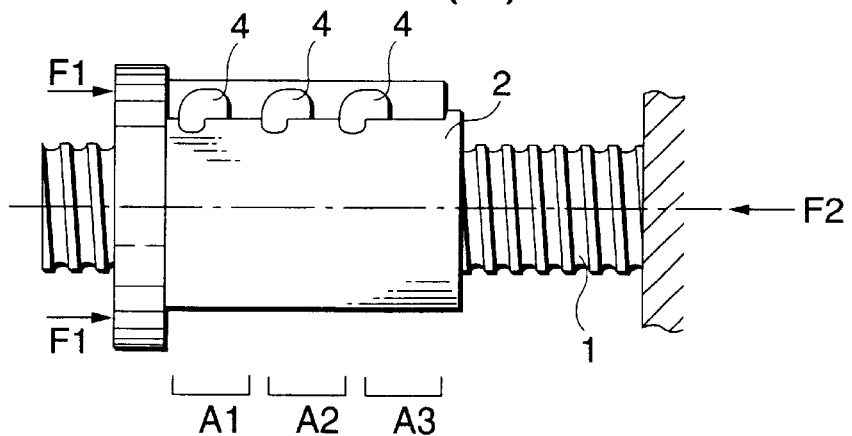

Firstly, a ball screw of a return tube circulating system including a circulation route comprising three circulation passages was analyzed in accordance with the present invention in the following manner. That is, there were used three ball screws of the above type: specifically, a ball screw A in which, as shown in FIG. 9(A), of the three circulation passages, the two circulation passages respectively situated on the axial-direction two ends of the whole circulation route are formed in phase with each other and the phase of the circulation passage situated in the center of the whole circulation route is reversed by 180 degrees in the circumferential direction of the ball nut 2 with respect to the other two circulation passages; for comparison with the ball screw A, a ball screw B which, as shown in FIG. 9(B), includes only one portion where the phases of the mutually adjoining circulation passages are reversed 180 degrees with respect to each other; and, also for comparison with the ball screw A, a ball screw C having a conventional arrangement in which, as shown in FIG. 9(B), the circumferential-direction phases of all of the three circulation passages are in phase with one another. That is, the three ball screws A, B and C were checked for their respective load distributions.

The specifications or the three ball screws used in this analysis were such that the screw shaft diameter was 100 mm, the lead was 20 mm, the bail diameter was 15.875 mm, the ball nut outside diameter was 149 mm, and the circulation route was wound 2.5 times and was composed of three circulation passages, whereas only the manner of arrangement of the circulation route was changed.

And, in each of these three ball screws having the same specifications, the screw shaft 1 was supported in a cantilever manner, while an axial-direction load F1=15000 kgf was applied to the end portion of the ball nut 2 that is opposite to the cantilevered side of the screw shaft 1.

Figure 10:
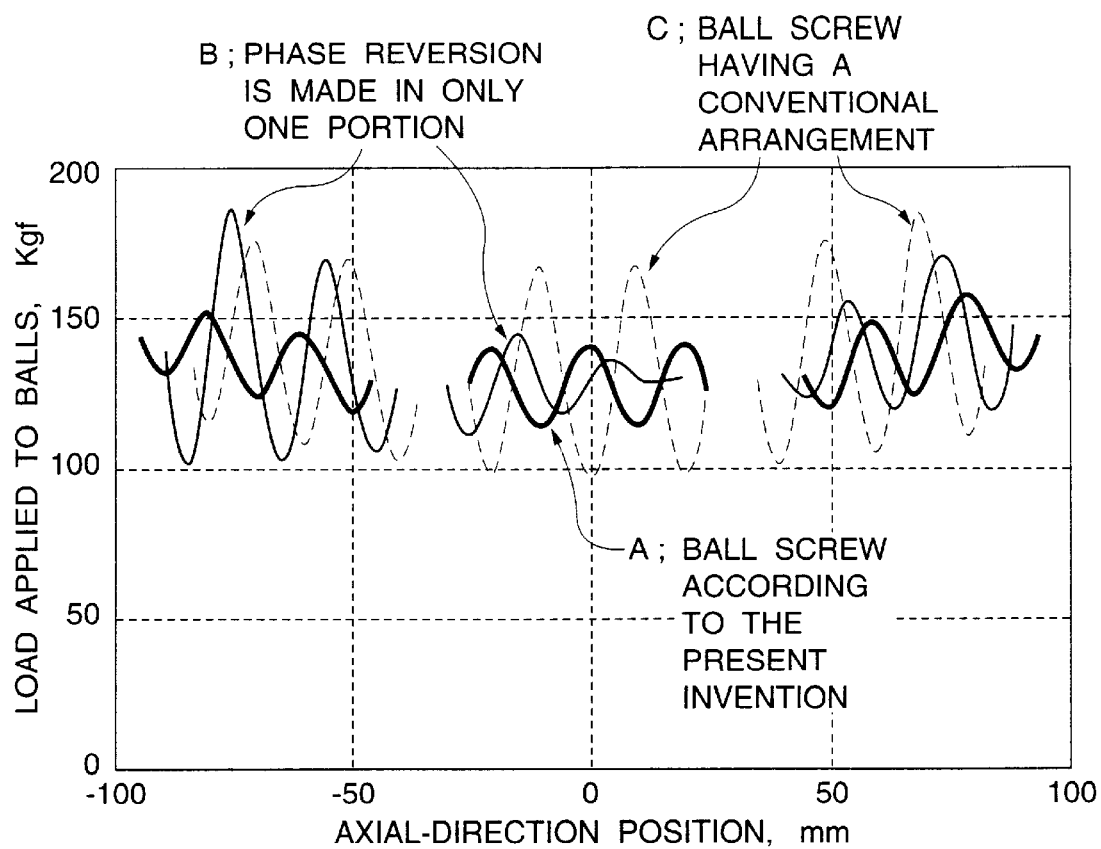
FIG. 10 is a graphical representation of the analysis results of the first embodiment of the invention.

FIG. 10 shows the results of the analysis.

Here, the horizontal axis in FIG. 10 shows axis-direction positions when the axial-direction center of the whole circulation route is used as the origin, whereas the vertical axis shows the intensities of normal-direction loads applied to balls 3 existing at the axis-direction positions. This also applies to the following embodiments of the invention similarly.

As can be seen from FIG. 10, in the ball screw B which includes only one portion where the phases of the mutually adjoining circulation passages are reversed 180 degrees with respect to each other, since the balance of the arrangement of the circulation passages is improved in the circumferential direction when compared with the conventional ball screw C, variations in the load distribution in the vicinity of the axial-direction center portion of the whole circulation route are relatively small; but, because the balance of the variations in the load distribution caused by the moments around the surface perpendicular to the axis S of the ball screw is bad, the variations in the load distribution increase as it approaches the axial-direction two ends of the whole circulation route.

On the other hand, in the ball screw A according to the invention, not only the balance of the circumferential-direction load distribution is improved but also the balance of the variations in the load distribution caused by the moments around the surface perpendicular to the axis S of the ball screw is improved, which shows that the variations in the load distribution are improved over the whole area of the ball screw in the axial direction thereof.

By the way, in this analysis, as an example, there is taken a return tube circulating system but it should be noted that, in other circulating systems as well, the present embodiment is able to obtain similar results.

Second Embodiment

Figure 11:
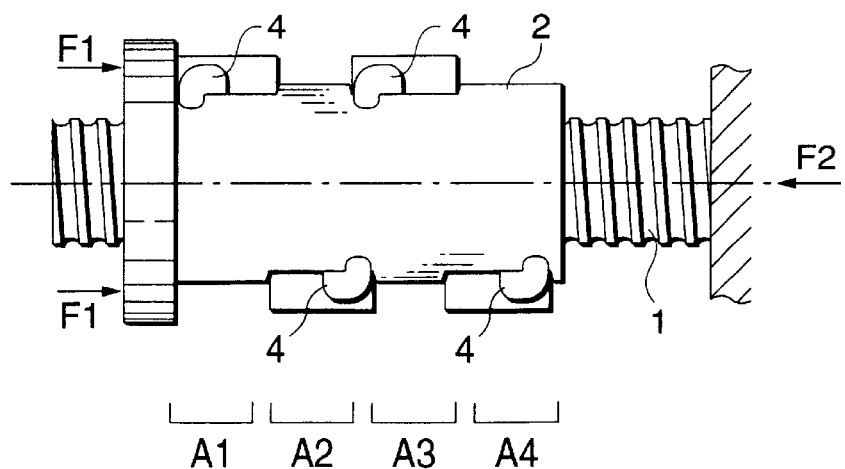
FIG. 11 is a schematic structure view of a second example of a ball screw of a second embodiment according to the invention.

In the present embodiment, similarly to the first embodiment, a ball screw of a return tube circulating system including a circulation route comprising four circulation passages was analyzed or checked for the load distribution thereof in accordance with the above-mentioned first mode for carrying the invention in the following manner. That is, there were used two ball screws of the above type: specifically, a ball screw A according to the invention in which, as shown in FIG. 1, of the four circulation passages, the two circulation passages respectively situated on the axial-direction two ends of the whole circulation route are formed in phase with each other and the phases of the remaining two circulation passages respectively situated in the axial-direction near-center portion of the whole circulation route are reversed by 180 degrees in the circumferential direction of the ball nut 2 with respect to the other two circulation passages; and, a ball screw A' according to the invention which, as shown in FIG. 11, includes three portions where the phases of the mutually adjoining circulation passages are reversed 180 degrees with respect to each other. That is, as described above, the two ball screws A and A' were checked for variations in their respective load distributions.

Figure 12A:
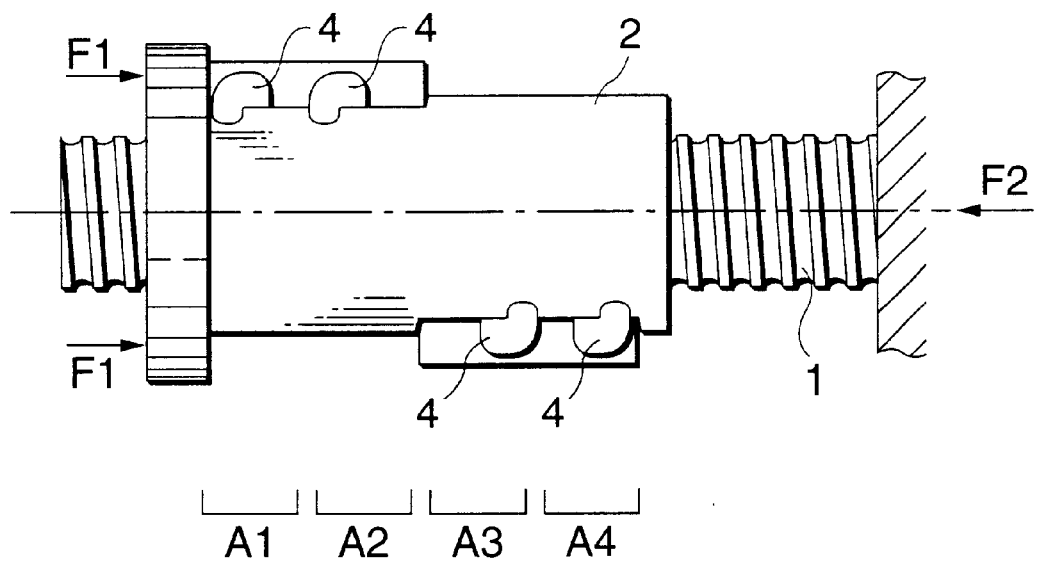
FIG. 12 is an explanatory view of the second embodiment according to the invention; and, in particular, FIGS. 12(A) and (B) are respectively schematic views of ball screws for comparison with the ball screws according to the second embodiment of the invention.
Figure 12B:
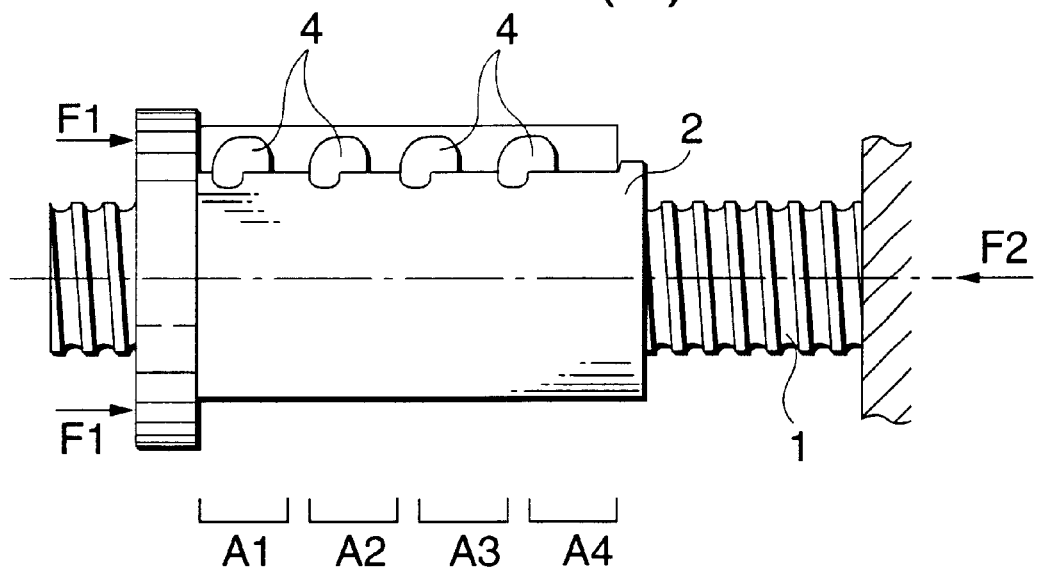

For comparison with the two ball screws A and A', there were prepared a ball screw B which, as shown in FIG. 12(A), includes only one portion where the phases of the mutually adjoining circulation passages are reversed 180 degrees with respect to each other, and a ball screw C having a conventional arrangement in which, as shown in FIG. 12(B), the four circulation passages are all formed in phase with one another in the circumferential direction thereof. And, these four ball screws A, A', B and C were analyzed or checked for their respective load distributions.

The specifications of the four ball screws used in this analysis were such that the screw shaft diameter was 100 mm, the lead was 20 mm, the ball diameter was 15.875 mm, the ball nut outside diameter was 149 mm, and the circulation route was wound 2.5 times and was composed of four circulation passages, whereas only the manner of arrangement of the circulation passages was changed.

And, in each of these four ball screws having the same specifications, the screw shaft 1 was supported in a cantilever manner, while an axial-direction load F1=20000 kgf was applied to the end portion of the ball nut 2 that is opposite to the cantilevered side of the screw shaft 1.

FIG. 13 shows the results of the analysis.

As can be seen from FIG. 13, in the ball screw B which includes only one portion where the phases of the mutually adjoining circulation passages are reversed 180 degrees with respect to each other, since the balance of the arrangement of the circulation passages is improved completely in the circumferential direction when compared with the conventional ball screw C, variations in the load distribution in the vicinity of the axial-direction center portion of the whole circulation route are small; but, because the balance of the load distribution caused by the moments around the surface perpendicular Lo the axis S of the ball screw is bad, the variations in the load distribution increase as it approaches the axial-direction two ends of the whole circulation route.

On the other hand, in the ball screw A according to the invention, not only the balance of the circumferential-direction load distribution is improved completely but also the balance of the load distribution caused by the moments around the surface perpendicular to the axis S of the ball screw is improved almost completely, which shows that the variations in the load distribution of the ball screw A are improved over the whole axial-direction area thereof.

Also, in the ball screw A' according to the invention, although the degree of improvement in the variations in the load distribution thereof is low when compared with the ball screw A, from FIG. 13, it can be found that the variations in the load distribution thereof are improved over the whole axial-direction area thereof when compared with the two comparison examples, that is, ball screws B and C.

Further, as can be seen from the analysis results of the ball screws A and A' according to the invention in FIG. 13, the ball screw A, which is set so as to have a surface symmetry in the axial-direction center portion of the circulation passage thereof, is improved in the variations in the load distribution thereof over the whole axial-direction area thereof far better than the ball screw A'.

In the above-mentioned first and second embodiments of the invention, description has been given of the ball screws in which their circulation routes respectively comprise three and four circulation passages. However, our further analyses have actually confirmed that, in the case of a ball screw in which a circulation route comprises five or more circulation passages and at least one of the circulation passages is reversed 180 degrees in the circumferential-direction phase thereof with respect to the other remaining circulation passages, there can be obtained similar results to the first and second embodiments.

Here, as can be understood from FIGS. 10 and 13, even when the first and second aspects of the invention are employed, in the case of a circulation route composed of three circulation passages, some variations can be found in the load distribution thereof, whereas, in the case of a circulation route composed of four circulation passages, almost no variations can be found. This shows that the first and second aspects of the invention, preferably, can apply more effectively to a circulation route which is composed of four or more circulation passages.

By the way, in these analysis, as an example, there is taken a return tube circulating system, but it should be noted here that, in other circulating systems as well, there can be obtained similar results.

Third Embodiment

Next, in a third embodiment, a ball screw of a frame circulating system, in which a circulation route is composed of twelve circulation passages and these twelve circulation passages are arranged at an equal phase interval of $\frac{1}{6}$ rotation, was analyzed in accordance with the above-mentioned second mode for carrying the invention in the following manner. Specifically, a ball screw A according to the invention in which, as shown in FIG. 5, one phase interval in the central portion of the whole circulation route, that is, a phase interval between the sixth and seventh circulation passages is offset greatly, namely, by $\frac{1}{2}$ rotation further from an equal phase interval set between the mutually adjoining ones of the remaining circulation passages to thereby provide a phase interval of a total of $\frac{2}{3}$ rotation, was checked for variations in the load distribution thereof.

For comparison with the ball screw A, there was prepared a ball screw C having a conventional arrangement in which all of the twelve circulation passages are arranged at an equal phase interval of $\frac{1}{6}$ rotation; and, the load distributions of the two ball screws A and C were analyzed.

The specifications of the two ball screws used in this analysis were such that the screw shaft diameter was 100 mm, the lead was 20 mm, the ball diameter was 15.875 mm, the ball nut outside diameter was 149 mm, and the circulation route was wound 0.83 times and was composed of twelve circulation passages, whereas only the manner of arrangement of the circulation passages was changed. And, in each of these two ball screws having the same specifications, the screw shaft 1 was supported in a cantilever manner, while an axial-direction load F1=20000 kgf was applied to the end portion of the ball nut 2 that is located opposite to the cantilevered side of the screw shaft The results of this analysis are shown in FIG. 14.

As can be seen from FIG. 14, in the ball screw C having a conventional arrangement, referring only to the circumferential direction of the circulation passages, the arrangement of the twelve circulation passages balances perfectly and, therefore, in the vicinity of the axial-direction center point of the whole circulation route, there is obtained a highly uniform load distribution. However, variations in the load distribution thereof increase as the load distribution moves away from the center portion toward the axial-direction two ends side of the whole circulation route. The reason for this is that two moments around a surface perpendicular to the axis S of the ball screw are badly balanced.

On the other hand, in the ball screw A according to the invention, not only the circumferential-direction load distribution thereof balances almost perfectly but also two moments around a surface perpendicular to the axis S of the ball screw are balanced almost perfectly. Due to this, variations in the load distribution thereof are improved over the whole axial-direction area of the ball screw A. In more particular, the reason for this is as follows. Each of the two circulation passage groups consists of six circulation passages and the two circulation passage groups are respectively situated on the two sides of the offset portion, that is, the axial-direction center portion of the whole circulation passage. When these two circulation passage groups are checked independently, similarly to the ball screw C, the circumferential-direction arrangement of each of the two circulation passage groups balances perfectly but the two moments around a surface which is perpendicular to the axis S of the ball screw are balanced badly; however, due to an interaction between the two circulation passage groups each comprising six circulation passages, the bad balance of the moments can be cancelled almost perfectly. Therefore, in the case of the ball screw A, not only the variations in the circumferential-direction load distribution thereof but also the variations in the load distribution caused by the moments around a surface perpendicular to the axis of the ball screw can be reduced.

By the way, in this analysis, as an example, there is taken a frame circulating system but it should be noted here that, in other circulating systems as well, there can be obtained similar results.

Fourth Embodiment

Next, in a fourth embodiment, a ball screw of a frame circulating system, in which a circulation route is composed of six circulation passages and these six circulation passages are generally arranged at an equal phase interval of 1/6 rotation in a spiral manner, was analyzed in accordance with the invention. Specifically, two typical ball screws A and B, whose phases are shifted in accordance with the invention, were checked for variations in their respective load distributions.

Figure 15A:
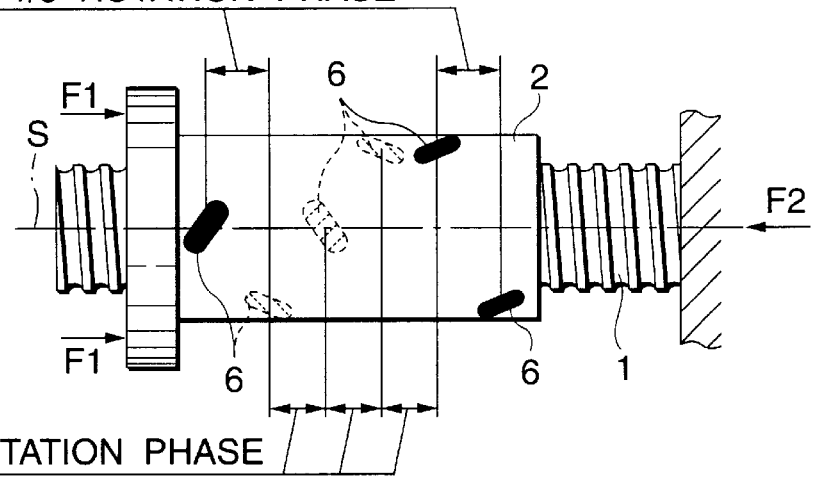
FIG. 15 is an explanatory view of a fourth embodiment according to the invention; and, in particular, FIGS. 15(A) and (B) are respectively schematic views of ball screws according to the invention.
FIG. 15(C) is a schematic view of a ball screw for comparison with the ball screws according to the fourth embodiment of the invention.
Figure 15B:
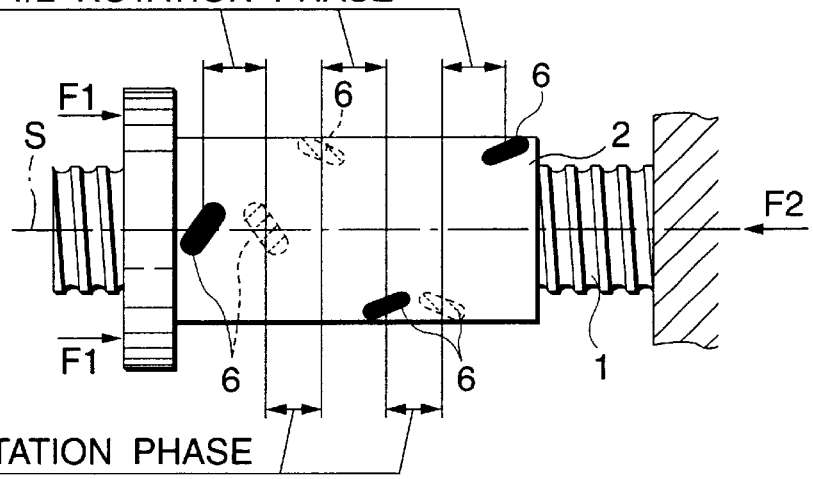

In the ball screw A, as shown in FIG. 15(A), of all of the phase intervals thereof, the axial-direction two end phase intervals, that is, the phase interval between the first and second circulation passages as well as the phase interval between the fifth and sixth circulation passages are respectively offset or increased by 1/6 rotation further from the equal phase interval (1/6 rotation) to thereby provide phase intervals each of a total of 1/3 rotation. Also, in the ball screw B, as shown in FIG. 15(B), three phase intervals, that is, a phase interval between the first and second circulation passages, a phase interval between the third and fourth circulation passages, and a phase interval between the fifth and sixth circulation passages are respectively offset or increased by 1/3 rotation further from the equal phase interval (1/6 rotation) to thereby provide phase intervals each of a total of 1/2 rotation.

Figure 15C:
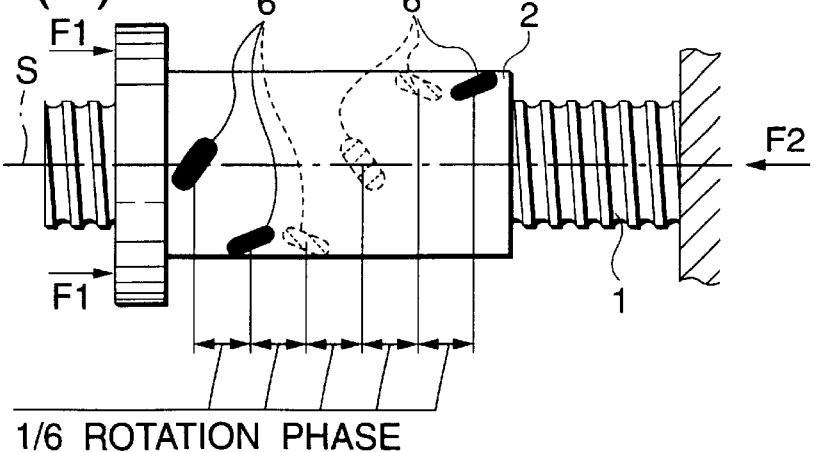

For comparison with the ball screws A and B, there was prepared a ball screw C having a conventional arrangement in which, as shown in FIG. 15(C), six circulation passages are all arranged at an equal phase interval or 1/6 rotation. That is, in this analysis, these three ball screws A, B and C were checked for their load distributions.

The specifications of these three ball screws used in this analysis were such that the screw shaft diameter was 100 mm, the lead was 20 mm, the ball diameter was 15.875 mm, the ball nut outside diameter was 149 mm, and the circulation route was wound 0.83 times and was composed of six circulation passages, whereas only the manner of arrangement of the circulation massages was changed. And, in each of these three ball screws having the same specifications, the screw shaft 1 was supported in a cantilever manner, while an axial-direction load F1=10000 kgf was applied to the end portion of the ball nut 2 that is opposite to the cantilevered side of the screw shaft 1.

Figure 16:
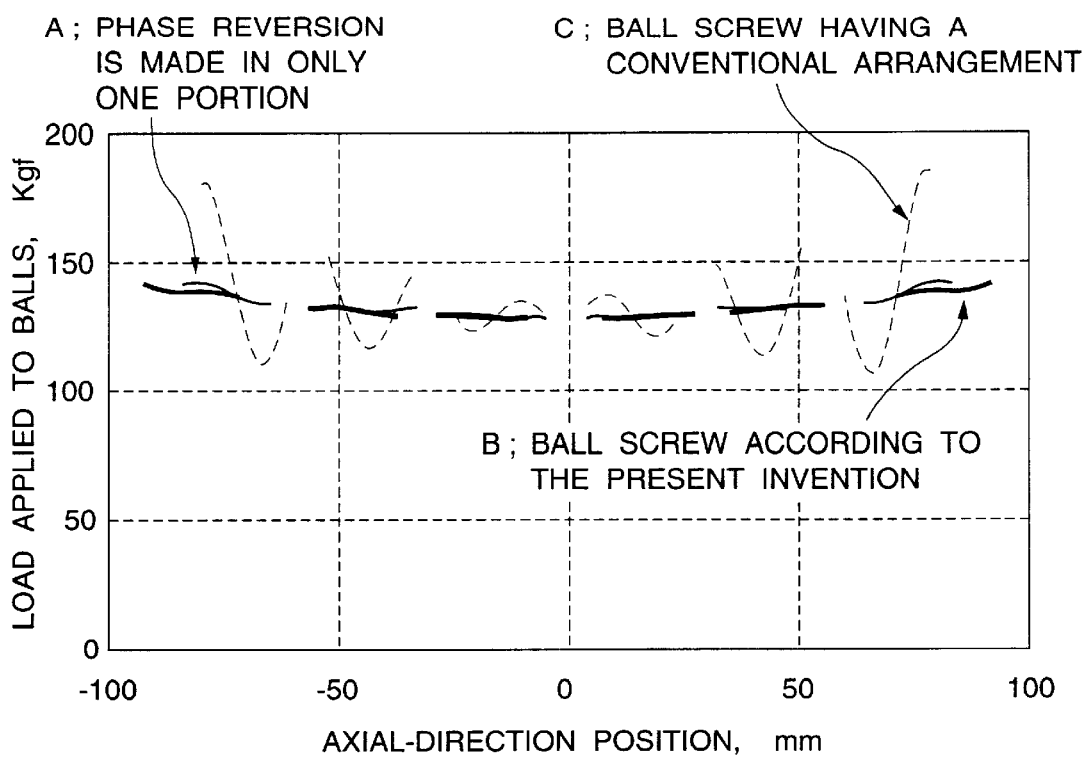
FIG. 16 is a graphical representation of the analysis results of the fourth embodiment of the invention.

The results of this analysis are shown in FIG. 16.

As can be seen from FIG. 16, in the ball screw C having a conventional arrangement, referring only to the circumferential direction of the circulation route, the arrangement of the six circulation passages balances perfectly and, therefore, in the vicinity of the axial-direction center point of the whole circulation route, there is obtained a highly uniform load distribution. However, variations in the load distribution thereof increase as the load distribution moves away from the center point. The reason for this is that two moments around a surface perpendicular to the axis S of the ball screw are badly balanced.

On the other hand, in the ball screw A according to the invention, since not only the circumferential-direction load distribution thereof balances well but also two moments around a surface perpendicular to the axis S of the ball screw are greatly improved in balance, variations in the load distribution of the ball screw A are reduced over the whole axial-direction area thereof.

The reason for this is as follows: that is, when a first circulation passage group consisting of the first, second and fourth circulation passages and a second circulation passage group consisting of the third, fifth and sixth circulation passages are checked independently, similarly to the ball screw C, the circumferential-direction load distributions of the two circulation passage groups balance perfectly but the moments around a surface perpendicular to the axis S of the ball screw are balanced badly; however, due to an interaction between the two circulation passage groups each comprising three circulation passages, the bad balance of the moments can be cancelled almost perfectly. Therefore, in the case of the ball screw A, not only the variations in the circumferential-direction load distribution thereof but also the variations in the load distribution caused by the moments around a surface perpendicular to the axis of the ball screw can be reduced. However, since some of the moment imbalance still remains, in the vicinity of the axial-direction two ends of the ball screw, the variations in the load distribution increase slightly.

On the other hand, in the ball screw B according to the invention, since not only the circumferential-direction load distribution thereof balances perfectly but also the moments around a surface perpendicular to the axis S of the ball screw balance perfectly, the variations in the load distribution of the ball screw B are reduced over the whole axial-direction area thereof.

The reason for this is as follows: that is, when a first circulation passage group consisting of the first, third and fifth circulation passages and a second circulation passage group consisting of the second, fourth and sixth circulation passages are checked independently, similarly to the ball screw C, the circumferential-direction load distributions of the two circulation passage groups balance perfectly but the moments around a surface perpendicular to the axis S of the ball screw are balanced badly; however, due to an interaction between the two circulation passage groups each comprising three circulation passages, the bad balance of the moments can be cancelled perfectly. Therefore, in the case of the ball screw B, not only the variations in the circumferential-direction load distribution thereof but also the variations in the load distribution caused by the moments around a surface perpendicular to the axis of the ball screw can be reduced.

By the way, the ball screw B according to the invention is improved in the uniformity of the load distribution further than the ball screw A according to the invention, whereas it has a disadvantage that the length of the whole circulation passage thereof, that is, the length of the ball nut 2 thereof is slightly larger than the ball screw A according to the invention.

Also, in this analysis, as an example, there is taken a frame circulating system but it should be noted here that, in other circulating systems as well, there can be obtained similar results.

Alternatively, in order to control variations in the intensity of the load in the axial-direction whole area of the ball screw, part of a plurality of circulation passages may be offset in the axial direction of the ball screw with respect to the remaining circulation passages to thereby apply a preload to balls existing in a given circulation passage, or part of the plurality of circulation passages may be set so as to have a narrower interval than the remaining circulation passages. As can be seen from FIG. 10 and FIG. 13, in the present embodiment, since the loads on the axial-direction center portion side of the whole circulation route are relatively small, a preload may be applied to the circulation passages in the axial-direction center portion, or the circulation passages in the axial-direction center portion may be set at a narrower interval than the remaining circulation passages to thereby increase the load distribution quantities of balls existing in the axial-direction center portion so as to further uniform the load distribution along the axial direction of the ball screw.

Similarly, the diameter of balls existing in the circulation passages in the axial-direction center portion of the whole circulation route may be increased over the remaining circulation passages, or the effective diameter of the ball nut in the circulation passages in the axial-direction center portion may be set smaller than that in the remaining circulation passages to thereby increase the load distribution quantities of balls existing in the axial-direction center portion so as to further uniform the load distribution along the axial direction of the ball screw.

Effects of the Invention

As has been described heretofore, with use of a ball screw according to the invention, variations in the load distribution of the ball screw caused by moments around a surface perpendicular to the axis of the ball screw that are generated by arranging a plurality of circulation passages forming the circulation route of the ball screw can be improved by simple means of specifying differences between the circumferential-direction phases of these circulation passages, thereby being able to uniform the load distribution between a plurality of balls rolling between the screw shaft and ball nut of the ball screw, which makes it possible to relieve the concentration of the load onto part of the balls. Thanks to this, there can be obtained an effect that the load capacity of the ball screw can be enhanced without increasing the diameter of the screw shaft of the ball screw.

That is, according to the invention, there can be obtained an effect that the load capacity of the ball screw can be enhanced without increasing the size of the ball screw, or the size of the ball screw for obtaining an equivalent load capacity can be reduced, thereby being able to spread the range of application of the ball screw to the high load use.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A ball screw comprising:
a screw shaft including a ball screw groove on the outer surface thereof;
at least one ball nut including on the inner surface thereof a ball screw groove opposed to said ball screw groove of said screw shaft;
a spiral-shaped passage formed by said ball screw groove of said ball nut and said ball screw groove of said screw shaft;
a number of balls capable of circulating through said spiral-shaped passage; and,
a return passage formed on said ball nut for allowing said number of balls to circulate through said spiral-shaped passage, wherein four or more circulation passages each comprising said spiral-shaped passage and said return passage are arranged along the axial direction of said ball screw,
wherein, in the circumferential-direction phases of said four or more circulation passages, there are formed at least two portions in which, the phases of two mutually adjoining circulation passages are reversed 180 degrees with respect to each other,
wherein said four or more circulation passages are arranged so as to have an almost surface symmetry with respect to a surface passing through the axial-direction center of the whole of said four or more circulation passages or passing through the neighboring portion of said axial-direction center and being perpendicular to the axis of said ball screw.

2. The ball screw according to claim 1, wherein each of circulation passages is formed by a circulation member which is mounted on said ball nut,
wherein said circulation passages comprises four circulation passages which are constituted by first to fourth circulation passages arranged along the axial direction, and
wherein mounting positions of the circulation member of said second and third circulation passages are respectively set at positions which are reversed 180° in the circumferential direction with respect to mounting positions of the circulation members of the first and fourth circulation passages.

3. The ball screw according to claim 2, wherein said four circulation passages are arranged so as to have an almost surface symmetry with respect to a surface passing through the axial-direction center of the whole of said four circulation passages and being perpendicular to the axis of said ball screw.

4. The ball screw according to claim 2, wherein said circulation member comprises a circulation tube.

5. A ball screw comprising:
a screw shaft including a ball screw groove on the outer surface thereof;
at least one ball nut including on the inner surface thereof a ball screw groove opposed to said ball screw groove of said screw shaft;
a spiral-shaped passage formed by said ball screw groove of said ball nut and said ball screw groove of said screw shaft;
a number of balls capable of circulating through said spiral-shaped passage; and
a return passage formed on said ball nut for allowing said number of balls to circulate through said spiral-shaped passage,
wherein four or more circulation passages each comprising said spiral-shaped passage and said return passage are arranged along the axial direction of said ball screw, and a phase difference is set between some of mutually adjoining circulation passages in the circumferential direction thereof a, and
wherein said four or more circulation passages are arranged so as to have an almost surface symmetry with respect to a surface passing through the axial-direction center of the whole of said four or more circulation passages or passing through the neighboring portion of said axial-direction center and being perpendicular to the axis of said ball screw.

6. The ball screw according to claim 5, wherein each of circulation passages is formed by a circulation member which is mounted on said ball nut, wherein said circulation passages comprises twelve circulation passages constituted by first to twelfth circulation passages which are arranged along the axial direction and are shifted at a predetermined phase interval of ⅙ rotation except for a relation between the sixth and seventh circulation passages, and wherein a phase difference between mounting position of the circulation member of said sixth circulation passage and that of said seventh circulation passage is set to a predetermined interval of ⅔ rotation.

7. The ball screw according to claim 5, wherein each of circulation passages is formed by a circulation member which is mounted on said ball nut, wherein said circulation passages comprises twelve circulation passages constituted by first to twelfth circulation passages which are arranged along the axial direction and are shifted at a predetermined phase interval of ⅙ rotation except for a relation between the six-h and seventh circulation passages, and wherein a phase difference between mounting position of the circulation member of said sixth circulation passage and that of said seventh circulation passage is set to a predetermined interval of m ⅔ rotation where m is an integral number.

8. A ball screw comprising:

a screw shaft including a ball screw groove on the outer surface thereof;

at least one ball nut including on the inner surface thereof a ball screw groove opposed to said ball screw groove of said screw shaft;

a spiral-shaped passage formed by said ball screw groove of said ball nut and said ball screw groove of said screw shaft;

a number of balls capable of circulating through said spiral-shaped passage; and a return passage formed on said ball nut for allowing said number of balls to circulate through said spiral-shaped passage, wherein three or more circulation passages each comprising said spiral-shaped passage and said return passage are arranged along the axial direction of said ball screw, and a phase difference of an equal phase interval is set between all of mutually adjoining circulation passages in the circumferential direction thereof, and wherein, in at least one portion between said mutually adjoining circulation passages, the circumferential-direction phase interval-thereof is offset from said equal phase interval.

9. The ball screw according to claim 8, wherein said circulation passages comprises six circulation passages constituted by first to sixth circulation passages which are arranged along the axial direction and are shifted at an equal phase interval of ⅙ rotation, wherein the phase interval between the first and second circulation passages as well as the phase interval between the fifth and sixth circulation passages are respectively offset or increased by ⅙ rotation further from the equal phase interval of ⅙ rotation, to thereby provide phase intervals each of a total of ⅓ rotation.

* * * * *